(12) United States Patent
Hebert

(10) Patent No.: US 11,693,256 B1
(45) Date of Patent: *Jul. 4, 2023

(54) EYEGLASS EXTENSION AND STRAP

(71) Applicant: Martin Hebert, Houma, LA (US)

(72) Inventor: Martin Hebert, Houma, LA (US)

( * ) Notice: Subject to any disclaimer, the term of this patent is extended or adjusted under 35 U.S.C. 154(b) by 234 days.

This patent is subject to a terminal disclaimer.

(21) Appl. No.: 17/101,340

(22) Filed: Nov. 23, 2020

Related U.S. Application Data

(63) Continuation of application No. 16/265,331, filed on Feb. 1, 2019, now Pat. No. 10,845,617.

(60) Provisional application No. 62/625,146, filed on Feb. 1, 2018.

(51) Int. Cl.
*G02C 3/00* (2006.01)

(52) U.S. Cl.
CPC ............. *G02C 3/003* (2013.01); *G02C 3/006* (2013.01)

(58) Field of Classification Search
CPC ................................ G02C 3/003; G02C 3/006
See application file for complete search history.

*Primary Examiner* — Wen Huang
(74) *Attorney, Agent, or Firm* — Garvey, Smith & Nehrbass, Patent Attorneys, L.L.C.; Seth M. Nehrbass; Fabian M. Nehrbass

(57) ABSTRACT

The present invention relates to an extension and strap for eyeglasses. More particularly, the present invention relates to an apparatus for holding eyeglasses onto a user's face that allows for eyeglasses to be put on and removed with only one hand. The present invention also includes a method of using the strap of the present invention to put on, retain in place, and remove eyeglasses using only one hand.

18 Claims, 8 Drawing Sheets

EYEGLASS EXTENSION AND STRAP

CROSS-REFERENCE TO RELATED APPLICATIONS

This is a continuation of my U.S. patent application Ser. No. 16/265,331, filed Feb. 1, 2019 (issued as U.S. Pat. No. 10,845,617 on Nov. 24, 2020), which claims priority of my U.S. Provisional Patent Application Ser. No. 62/625,146, filed Feb. 1, 2018, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an extension and strap for eyeglasses. More particularly, the present invention relates to an apparatus for holding eyeglasses onto a user's face that allows for eyeglasses to be put on and removed with only one hand. The present invention also includes a method of using the strap of the present invention to put on, retain in place, and remove eyeglasses using only one hand.

2. General Background of the Invention

Eyeglasses including safety glasses, sunglasses, and prescription eyewear are generally known in the art and are typically secured to a user's face by ear piece that are curved to rest on top of the user's ears. This design is useful in that it is easily placed on and removed; however, it often allows glasses to slip down a user's face out of position, or off the user's head and ears completely requiring some type of securing device to keep eyeglasses in place. Different straps and securing devices are also known in the art, however these devices typically include a flexible and adjustable strap, which requires that the user use both hands to secure and tighten the strap into place.

The present invention allows a user to place their eyeglasses on securely with only one hand through the use of a semi-rigid strap that extends the ear pieces of the eyeglasses preventing them from slipping down the face or off the ears of the user, while still allowing the user to place on and remove the glasses using only one hand.

BRIEF SUMMARY OF THE INVENTION

The apparatus of the present invention is an apparatus for holding eyeglasses onto a user's face that allows for eyeglasses to be put on and removed with only one hand. The present invention also includes a method of using the strap of the present invention to put on, retain in place, and remove eyeglasses using only one hand

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

The present invention is an apparatus 1, 10 for securing eyeglasses 2 to a user 9 and method of using the apparatus 1, 10 to securely place eyeglasses 2 on a user 9 and remove them from the user using only one hand of the user 9.

Figure 9:
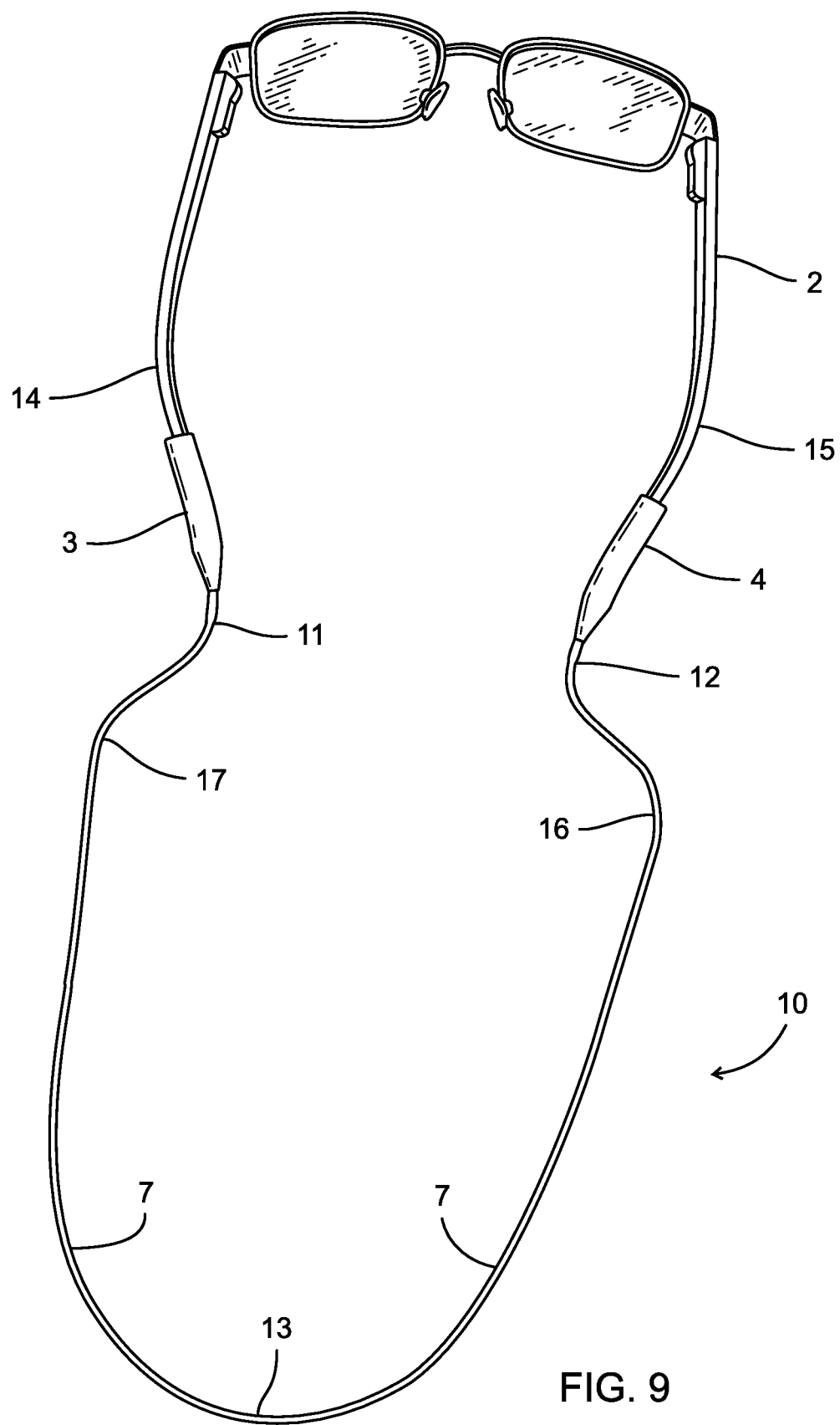

As shown in FIG. 9, the apparatus 10 preferably comprises a semi-rigid strap 7, a left connector 3, and a right connector 4. Preferably, the semi-rigid strap 7 is generally U-shaped having two ends 11, 12 and a curved center 13. More preferably, the semi-rigid strap 7 has two side curve portions 16, 17, each side curve portions 17, 16 being near each end of the strap 11, 12 such that the strap 7 has one S-shaped curve at each end 11, 12, and a curved center 13. Preferably, the semi-rigid strap 7 is made of semi rigid plastic or rubber, such as monofilament nylon, polyvinylidene difluoride, polyvinyl chloride, polypropylene, or polyethylene. A prototype was made with monofilament nylon. It can be made either in two pieces or molded together.

Preferably, the left connector 3 connects the left ear piece 14 of the eyeglasses 2 to one end 11 of the semi-rigid strap 7, and the right connector 4 connects the right ear piece 15 of the eyeglasses 2 to the other end 12 of the semi-rigid strap 7. Preferably, the left and right connectors 3, 4 are made of rubber or another suitable material that allows the connectors 3, 4 to be securely attached to the ear pieces 14, 15, preferably by sliding the ear pieces 14, 15 into the connectors 3, 4 like a sleeve. The suitable material can be nitrile, hydrogenated nitrile, Viton rubber, or natural rubber. A prototype was made with nitrile.

Figure 1:
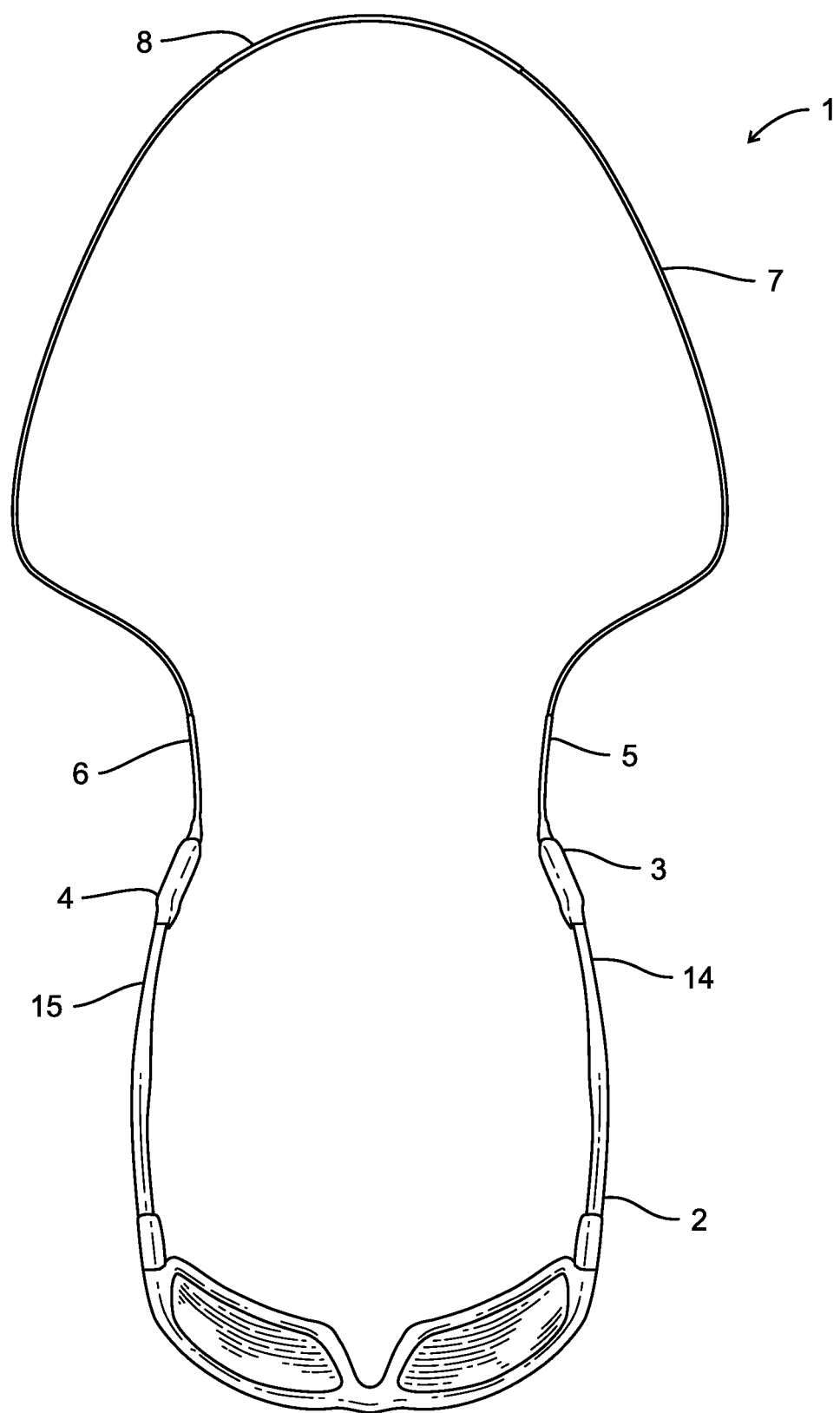
FIG. 1 is a top view of a preferred embodiment of the apparatus of the present invention attached to a pair of eyeglasses.
Figure 2:
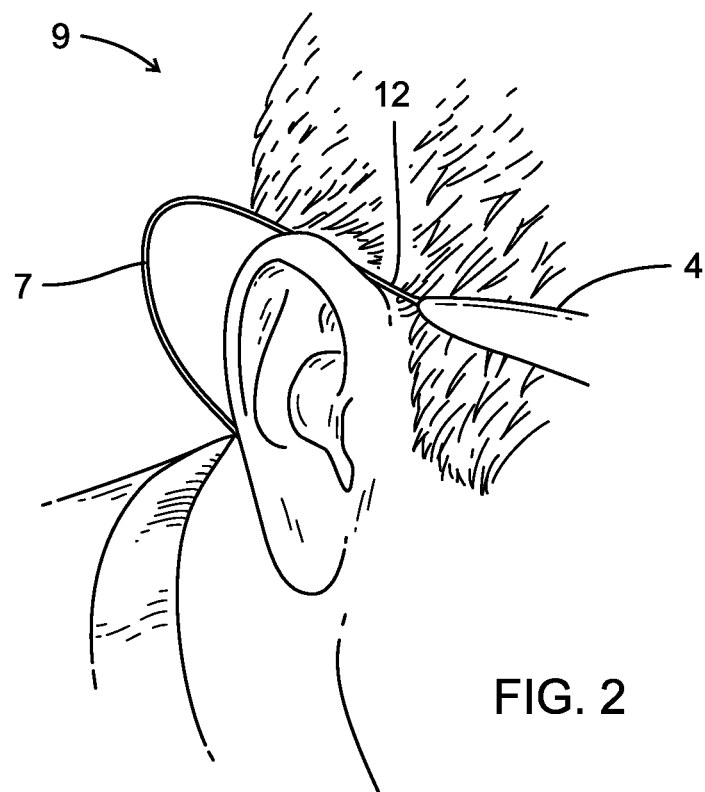
FIGS. 2-8 are various views of the steps of a preferred method of the present invention; and, FIG. 9 is a top view of a preferred embodiment of the present invention.
Figure 3:
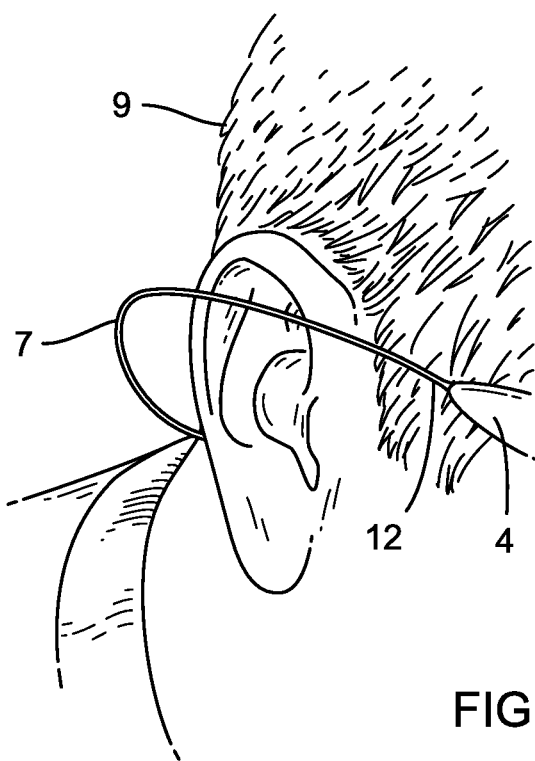
Figure 4:
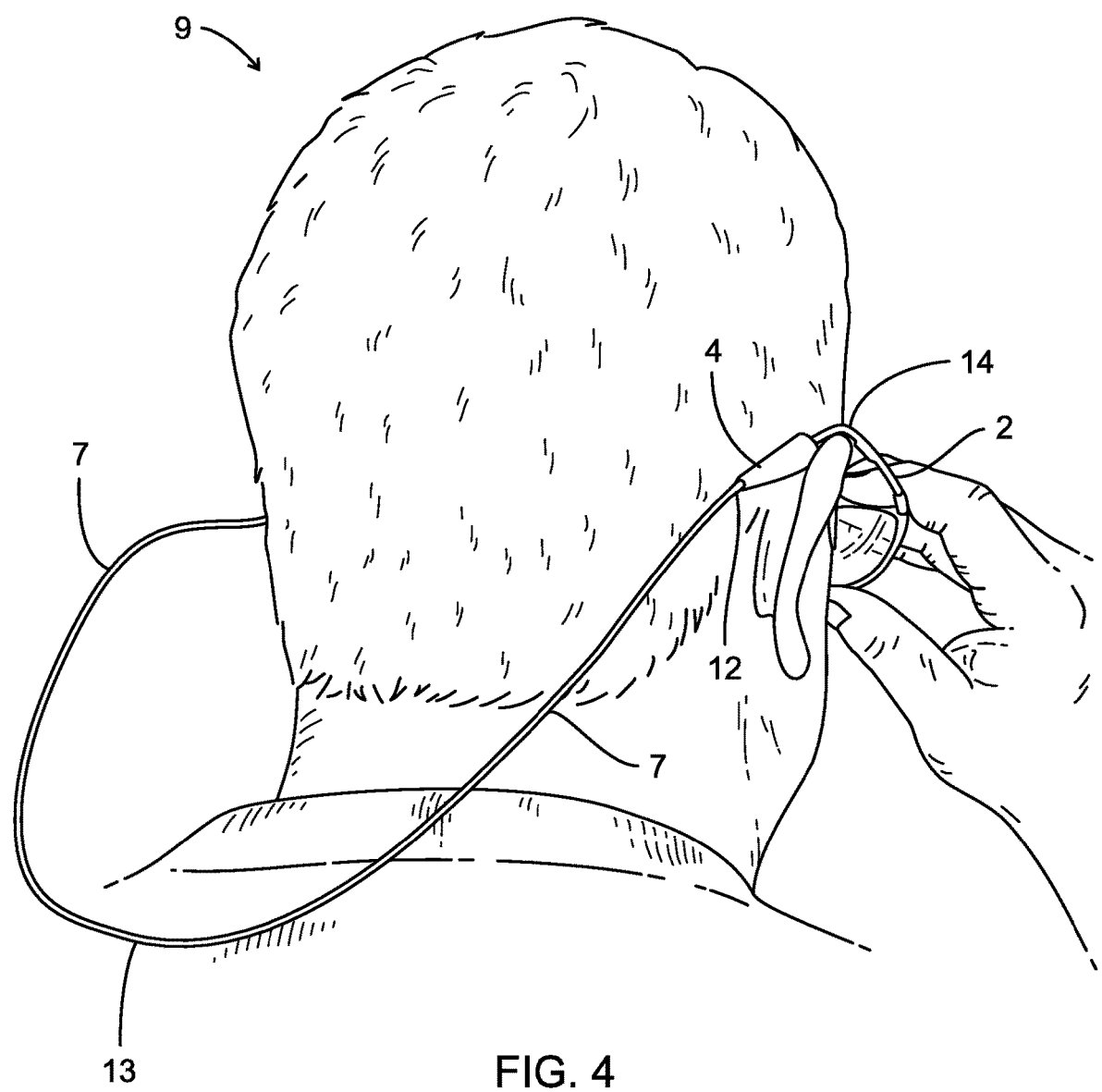
Figure 5:
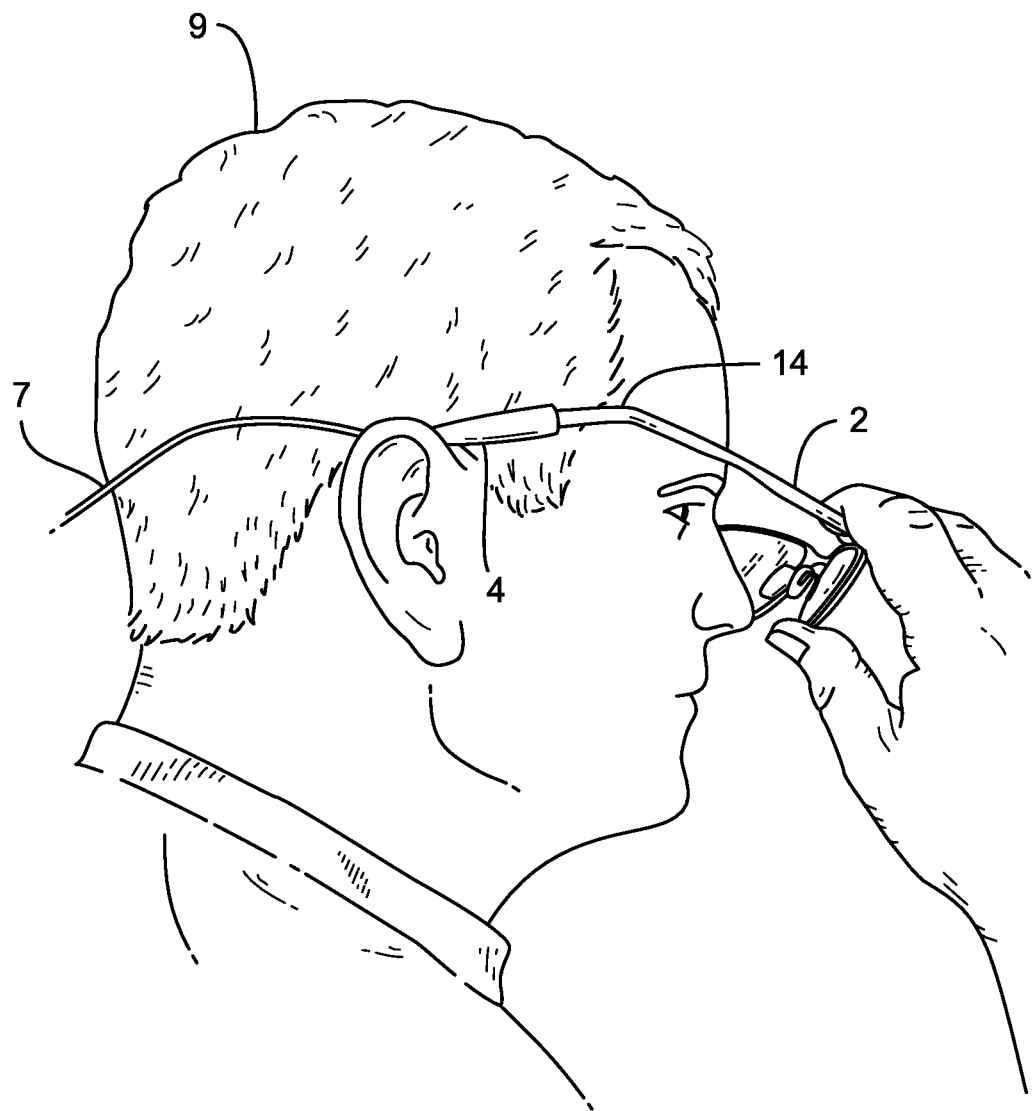
Figure 6:
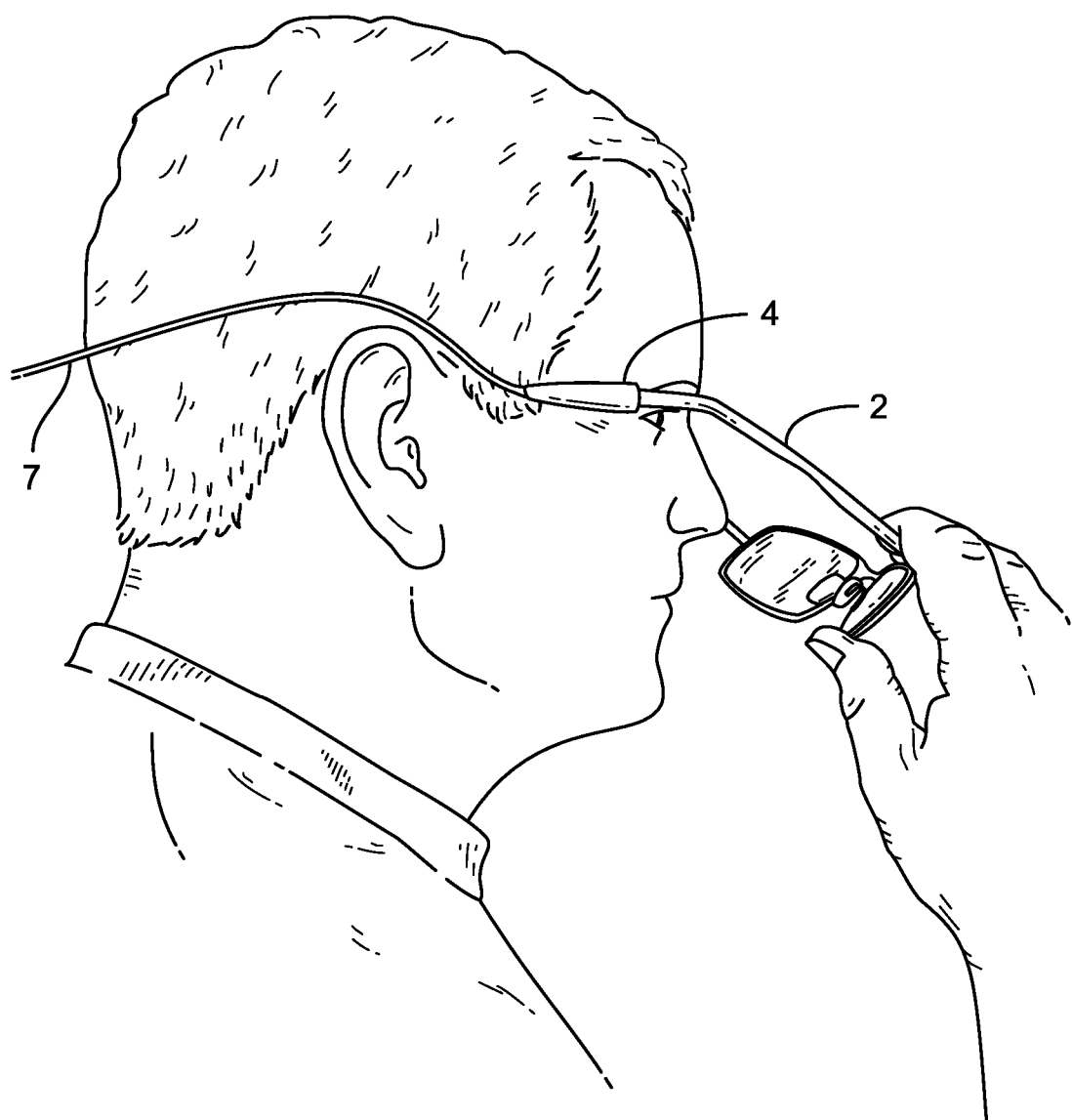
Figure 7:
Figure 8:
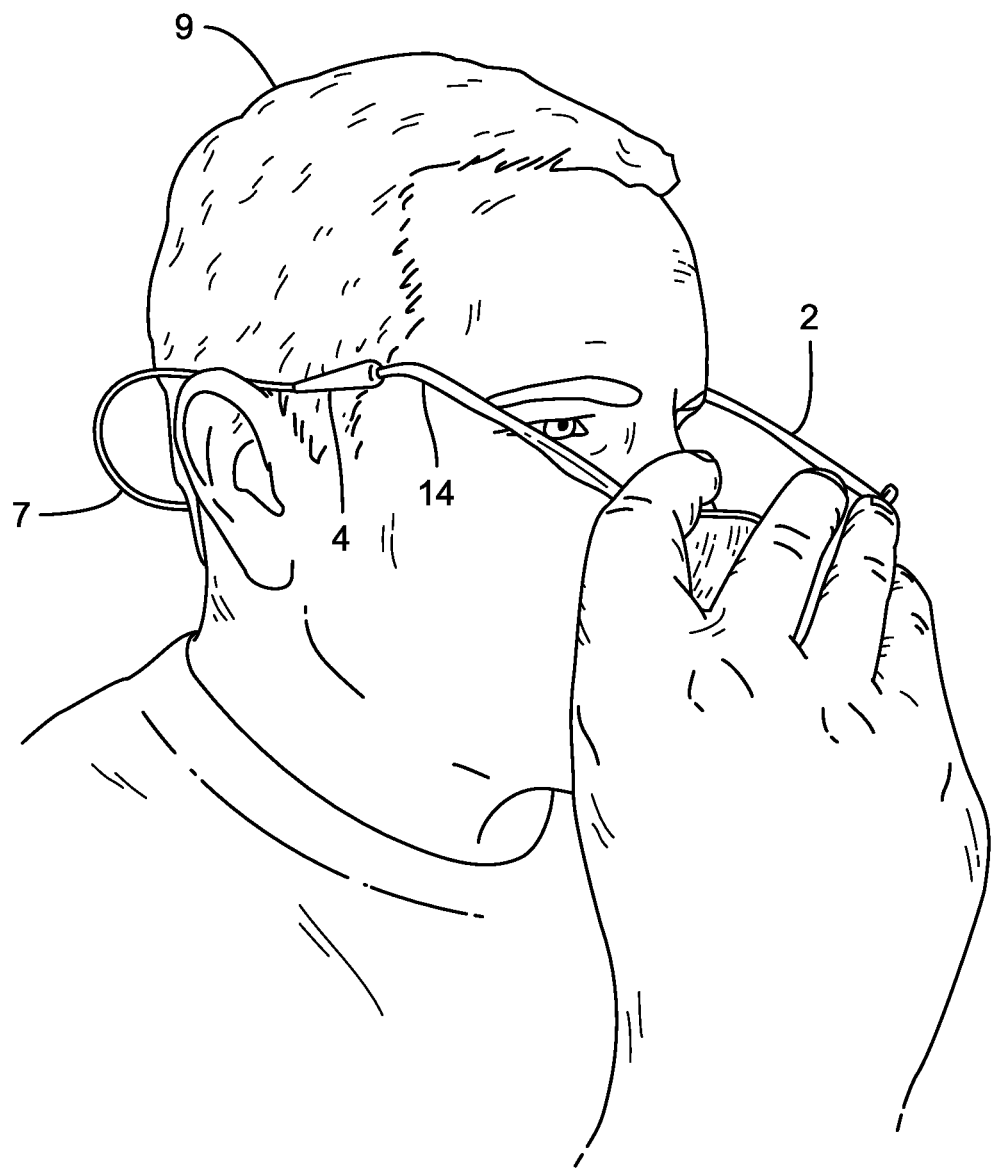

In one embodiment shown in FIG. 1, the apparatus 1 may further include two extenders 5, 6, each extender 5, 6 being placed between each connector 3, 4 and each end 11, 12 of the semi-rigid strap 7. Preferably, the extenders are made of flexible rubber (such as nitrile, hydrogenated nitrile, Viton rubber, or natural rubber). A prototype was made with polyvinyl chloride (shrink wrap).

In one embodiment shown in FIG. 1, the apparatus 1 further comprising a head support 8 at the curved center 13 of the semi-rigid strap 7. Preferably, the head support is made of flexible rubber, (such as nitrile, hydrogenated nitrile, Viton rubber, or natural rubber). A prototype was made with polyvinyl chloride (shrink wrap).

The present invention also includes a method of placing eyeglasses 2 on a user's 9 face using the apparatus of the present invention, the method comprising the following steps:

a) fitting the eyeglasses 2 with the apparatus 1, 10 of the present invention; and b) using only one hand of the user 9, placing the semi-rigid strap 7 over the user's 9 head, and the ear pieces 14, 15 of the eyeglasses 2 in place on the user's 9 ears.

The method may further include a removal step:

c) using only one hand of the user 9, removing the eyeglasses 2 from the user 9 by lifting the ear pieces 14, 15 off the user's 9 ears and lifting the semi-rigid strap 7 over the user's 9 head.

The apparatus 1 can these also be removed from the face and hung around the user's neck. The rubber connectors help hold the glasses in place. The curved design (16 and 17) allows glasses to be put on and removed easily with one hand. The design also decreases wear and tear on the glasses associated with abnormal bending and flexing from putting them on and off with a conventional strap.

Preferably, step a) is carried out by attaching the connectors 3, 4 to the ear pieces 14, 15 by securing the connector 3, 4 over and around the ear piece 14, 15.

The eyeglasses 2 may be any type of eyewear including sunglasses, safety glasses, reading glasses or other prescription eyewear.

PARTS LIST

The following is a list of parts and materials suitable for use in the present invention: PartsNumber Description
1 apparatus of a preferred embodiment of the present invention attached to eyeglasses
2 eyeglasses
3 left connector
4 right connector
5 left extender—optional
6 right extender—optional
7 strap
8 head support—optional
9 user
10 apparatus of a preferred embodiment of the present invention attached to eyeglasses
11 end
12 end
13 curved center
14 ear piece
15 ear piece
16 side curve portion
17 side curve portion All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. Apparatus for securing eyeglasses to a user, the apparatus comprising
a semi-rigid strap,
a left connector, and
a right connector,
wherein the eyeglasses have a left ear piece and a right ear piece, wherein the semi-rigid strap has two ends and a curved center, and wherein the left connector connects the left ear piece to one end of the semi-rigid strap and the right connector connects the right ear piece to the other end of the semi-rigid strap; and wherein the semi-rigid strap has two side curve portions, each side curve portion being near each end of the strap such that the strap has one S-shaped curve at each end and the strap extends outward between portions of the two S-shaped curves; the semi-rigid strap configured to allow a user to put on and remove the eyeglasses using only one hand.

2. The apparatus of claim 1 wherein the left and right connectors are made of rubber.

3. The apparatus of claim 1 wherein the semi-rigid strap is made of plastic or rubber.

4. The apparatus of claim 1 further comprising two extenders, each extender being placed between each connector and each end of the semi-rigid strap.

5. The apparatus of claim 4 wherein the extenders are made of flexible rubber.

6. The apparatus of claim 1 further comprising a head support, the head support being placed at the curved center of the semi-rigid strap.

7. The apparatus of claim 6 wherein the head support is made of flexible rubber.

8. Apparatus for securing eyeglasses to a user, the apparatus comprising
a semi-rigid strap,
a left connector,
a right connector, and
two extenders,
wherein the eyeglasses have a left ear piece and a right ear piece, and wherein the semi-rigid strap has two ends, and wherein the left connector connects the left ear piece to one end of the semi-rigid strap via one of the two extenders, and the right connector connects the right ear piece to the other end of the semi-rigid strap via the other of the two extenders; and wherein the semi-rigid strap has two side curve portions, each side curve portion being near each end of the strap such that the strap has one S-shaped curve at each end and the strap extends outward between portions of the two S-shaped curves, said S-shaped curves allowing a user to put on and remove the eyeglasses using only one hand.

9. The apparatus of claim 8 wherein the semi-rigid strap has a curved center, the apparatus further comprising a head support at the curved center of the semi-rigid strap.

10. The apparatus of claim 8 wherein the semi-rigid strap is made of semi rigid plastic or rubber.

11. The apparatus of claim 8 wherein the left and right connectors are made of rubber or nitrile.

12. The apparatus of claim 9 wherein the head support is made of flexible rubber.

13. Apparatus for securing eyeglasses to a user, the apparatus comprising
a semi-rigid strap,
a left connector, and
a right connector,
wherein the eyeglasses have a left ear piece and a right ear piece, wherein the semi-rigid strap has two ends and two side portions, each side curve portion being near each end of the strap such that the strap has one S-shaped curve at each end and the strap extends outward between portions of the two S-shaped curves, wherein the left connector connects the left ear piece to one end of the semi-rigid strap and the right connector connects the right ear piece to the other end of the semi-rigid strap; the S-shaped curves of the semi-rigid strap configured to allow a user to put on and remove the eyeglasses using only one hand.

14. The apparatus of claim 13 wherein the semi-rigid strap is generally U-shaped and has a curved center.

15. The apparatus of claim 13 further comprising two extenders,
each extender being placed between each connector and each end of the semi-rigid strap.

16. The apparatus of claim 14 further comprising a head support,
 the head support being placed at the curved center of the semi-rigid strap.

17. The apparatus of claim 13 wherein the semi-rigid strap is shaped to fit around a user's head.

18. The apparatus of claim 13 wherein the semi-rigid strap is made of semi rigid plastic or rubber.

\* \* \* \* \*